(12) United States Patent
Sakai (10) Patent No.: US 6,732,262 B1
(45) Date of Patent: May 4, 2004

(54) METHOD AND SYSTEM FOR CONTROLLING RESET OF IEEE 1394 NETWORK

(75) Inventor: Yasushi Sakai, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/551,572

(22) Filed: Apr. 18, 2000

(30) Foreign Application Priority Data

Oct. 8, 1999 (JP) .......................................... 11-288117

(51) Int. Cl.[7] ....................... G06F 15/177; G06F 15/16; G06F 13/368
(52) U.S. Cl. .................. 713/1; 709/249; 714/4; 714/7
(58) Field of Search ............................ 713/1; 709/249, 709/218; 714/4–7

(56) References Cited

U.S. PATENT DOCUMENTS

| | | | | |
|---|---|---|---|---|
| 5,659,786 A | * | 8/1997 | George et al. .............. 713/100 |
| 5,764,930 A | * | 6/1998 | Staats ........................... 710/107 |
| 5,878,232 A | * | 3/1999 | Marimuthu .................. 709/249 |
| 5,991,842 A | * | 11/1999 | Takayama .................... 710/105 |
| 6,138,194 A | * | 10/2000 | Klein et al. .................. 710/302 |
| 6,173,346 B1 | * | 1/2001 | Wallach et al. .............. 710/302 |
| 6,199,119 B1 | * | 3/2001 | Duckwall et al. .............. 710/8 |
| 6,298,405 B1 | * | 10/2001 | Ito et al. ...................... 710/107 |
| 6,370,146 B1 | * | 4/2002 | Higgins et al. .............. 370/400 |

* cited by examiner

Primary Examiner—Thomas Lee
Assistant Examiner—Eric Chang
(74) Attorney, Agent, or Firm—Arent Fox (57) ABSTRACT

An IEEE 1394 protocol controller includes a data transfer determination circuit which determines whether communication is being performed over the network. A reset control circuit connected to the determination circuit detects the connection of a new node to the network (e.g., hot plugging) and reconfigures the network to include the new node subsequent to the completion of the data transfer based on the determination result of the determination circuit.

32 Claims, 8 Drawing Sheets

METHOD AND SYSTEM FOR CONTROLLING RESET OF IEEE 1394 NETWORK

BACKGROUND OF THE INVENTION

The present invention relates to a method and system for controlling a network, and more particularly, to a method and system for a network having an IEEE 1394 hot plugging function.

A data communication system having an interface that complies with the IEEE 1394 standard includes a hot plugging function which permits new devices to be connected to an already active network. When a new device is connected, the system automatically reconfigures the network to recognize the new device.

A personal computer and peripheral equipment, such as a digital video camera and a color page printer, are each provided with an interface controller for transferring data in compliance with the IEEE 1394 standard. When an interface controller detects the connection of a new node (device) to its port (socket), the controller provides a reset command to each of the nodes in the network. In response to the command, the interface controller of each of the nodes connected to the network remaps the network configuration (topology), consequently reconfiguring the network.

Figure 1:
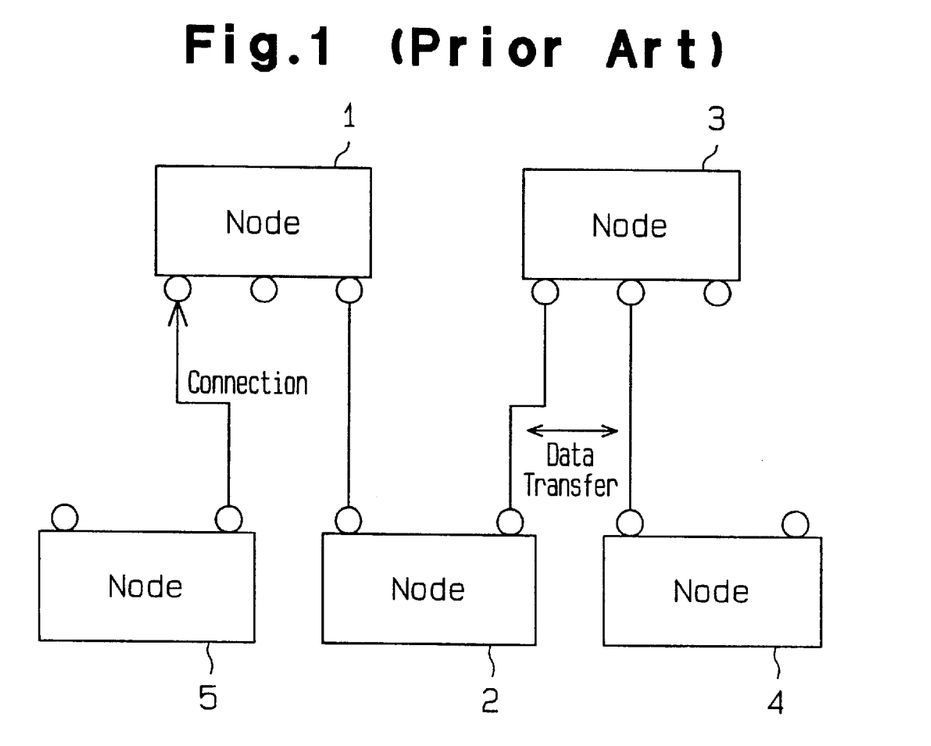
FIG. 1 is a schematic diagram showing a typical network.

However, the connection or disconnection of a device is often performed regardless of data whether data is being transferred between nodes. FIG. 1 illustrates an example of a network formed by a plurality of nodes 1–4. If a node 5 is newly connected to the node 1 while data is being transferred between the nodes 2, 4, the node 1 detects the connection of the node 5 and provides a reset command to each of the nodes 2–5. This resets all of the nodes 1–5 and interrupts and stops the data transfer occurring between the nodes 2 and 4.

For example, data is transferred by a plurality of packets in an interface complying with the IEEE 1394 standard. Thus, even if the transfer of data packets is interrupted, all of the data packets are transferred again upon restarting. This is because the receipt of the data packets which were interrupted during transfer cannot be confirmed. As a result, the transfer of data packets must be performed once more from the beginning.

SUMMARY OF THE INVENTION

It is an object of the present invention to provide a network control method and system that guarantees the transfer of data while enabling hot plugging.

To achieve the above object, the present invention provides a method for controlling a network having a configuration including a plurality of nodes. The method includes the steps of recognizing the connection of a new node to the network, determining whether a communication is being performed in the network prior to the recognizing step, completing the communication, and reconfiguring the network, which includes the new node, subsequent to completion of the communication based on the determination result.

A further aspect of the present invention provides a method for controlling a network having a configuration including a plurality of nodes. The method includes the steps of recognizing the connection of a new node to the network, determining whether communication is being performed in the network, interrupting the communication based on the determination result, reconfiguring the network including the new node, and restarting the interrupted communication.

Another aspect of the present invention provides an apparatus for controlling a network having a configuration including a plurality of nodes. The system includes a data transfer determination circuit for determining whether communication is being performed in the network. A reset control circuit, connected to the determination circuit, recognizes the connection of a new node to the network and reconfigures the network to include the new node, subsequent to completion of the communication based on the determination result of the data transfer determination circuit.

A further aspect of the present invention provides an apparatus for controlling a network having a configuration including a plurality of nodes. The system includes a data transfer determination circuit for determining whether communication is being performed in the network. A reset control circuit, connected to the determination circuit, recognizes the connection of a new node to the network and interrupts the communication based on the determination result of the data transfer determination circuit, reconfigures the network, which includes the new node, subsequent to the interruption of the communication, and restarts the interrupted communication.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 2:
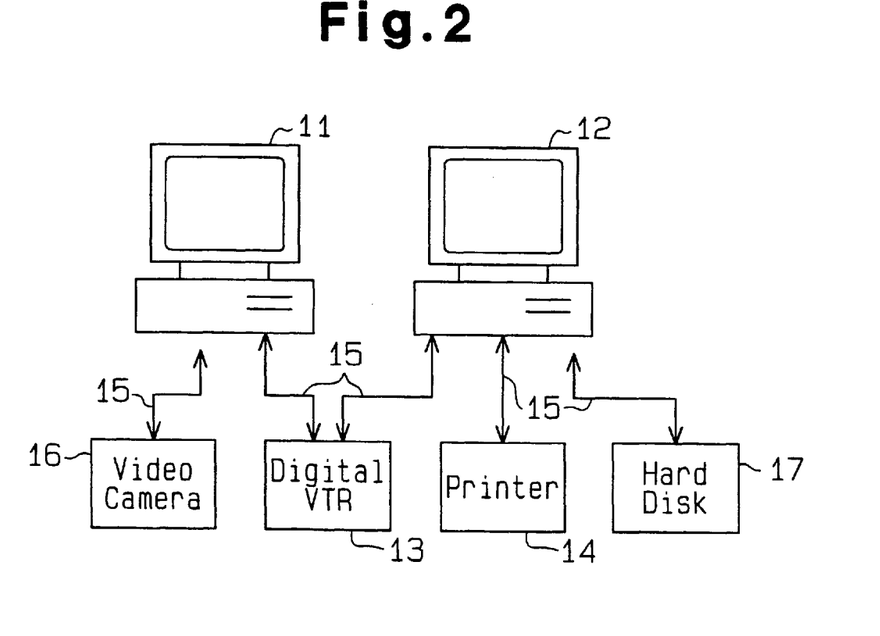
FIG. 2 is a schematic diagram showing a network configured with IEEE 1394 buses.

FIG. 2 is a schematic diagram showing a network using serial interfaces that comply with the IEEE 1394 standard. The network includes personal computers 11, 12, a digital VTR 13, and a printer 14, which are connected to one another with IEEE 1394 bus cables (hereafter referred to as IEEE 1394 buses) 15. The personal computers 11, 12, the digital VTR 13, and the printer 14, each have an IEEE 1394 protocol controller, which transfers data in compliance with the IEEE 1394 standard and serves as an interface controller.

A video camera 16 and a hard disk 17 each have an IEEE 1394 protocol controller and are also connected to the network with IEEE 1394 buses 15. The protocol controller of each system functions as a node of the network.

Figure 3:
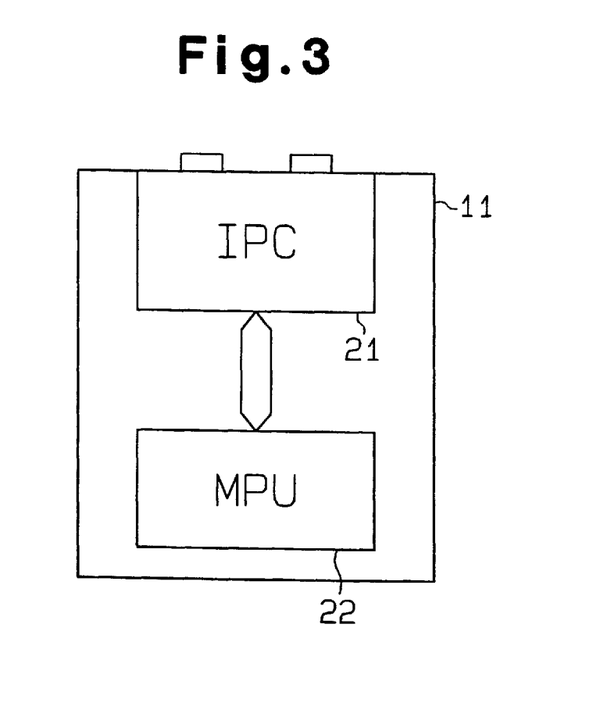
FIG. 3 is a schematic block diagram showing a network device.

FIG. 3 is a schematic block diagram showing the personal computer 11. The personal computer 11 includes an IEEE 1394 protocol controller (hereafter referred to as IPC) 21 and a microprocessing unit (hereafter referred to as MPU) 22. The IPC 21 and the MPU 22 transfer data between each other.

Figure 4:
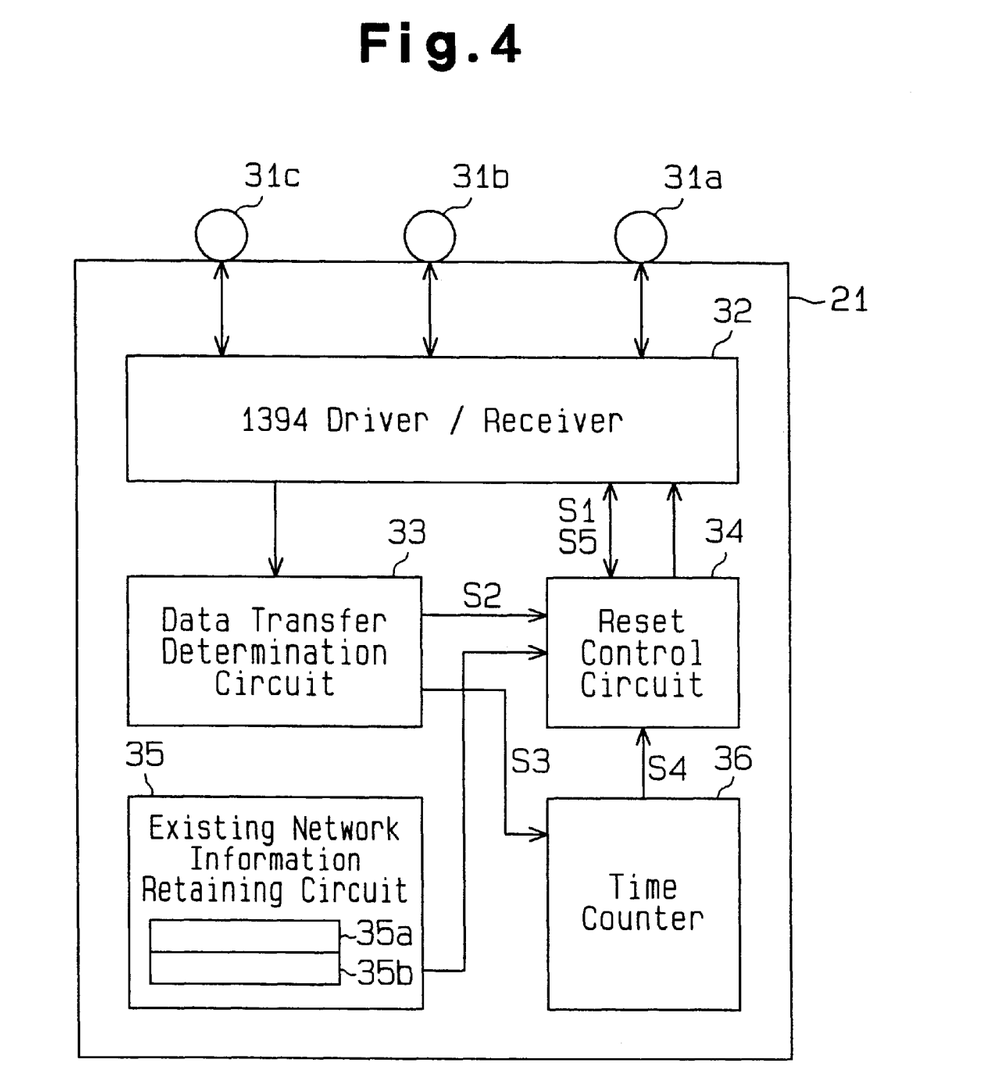
FIG. 4 is a schematic block diagram showing a protocol controller, which is used in the device of FIG. 3, according to a first embodiment of the present invention.

FIG. 4 is a schematic block diagram showing the IPC 21.

The IPC 21 has three ports 31a, 31b, 31c, a 1394 driver/receiver 32, a data transfer determination circuit 33, a reset control circuit 34, an existing network information retaining circuit 35, and a time counter 36.

The driver/receiver 32 receives data from other devices (nodes) via the ports 31a–31c and determines whether the data is addressed to it. If the data is addressed to it, the driver/receiver 32 provides the data to the MPU 22. The driver/receiver 32 also transfers the data received from the MPU 22 to the other nodes via the ports 31a–31c. If the received data is not addressed to it, the driver/receiver 32 transfers the data to the other nodes via ports other than the port through which the data was received.

The driver/receiver 32 monitors the connections at the ports 31a–31c and provides a monitor signal S1, which indicates a change in the topology, to the reset control circuit 34 when a new device is connected to the ports 31a–31c or when a device is disconnected from the ports 31a–31c. Further, the driver/receiver 32 provides a bus reset signal S5 to the reset control circuit 34 upon receipt of a bus reset signal from one of the other nodes.

The data transfer determination circuit 33 determines whether its node is in the process of communication (busy) based on the state of the driver/receiver 32 and provides a determination signal S2 to the reset control circuit 34. Further, the data transfer determination circuit 33 provides a count reset signal S3 to the time counter 36 when it determines that no signals are being transmitted over the IEEE 1394 bus (indicating a blank period between the transfer of packets) based on the state of the driver/receiver 32.

The reset control circuit 34 controls bus reset when hot plugging occurs. When a change in the topology is detected based on the monitor signal S1 from the driver/receiver 32, the reset control circuit 34 determines whether data is being transferred based on the determination signal S2. If data is being transferred, the reset control circuit 34 inhibits bus reset until the transfer of data is completed. This prevents interruption of data transfer and allows the transfer of data to be completed.

The existing network information retaining circuit 35 has a section (register section) for retaining information of the devices connected to the network by the IEEE 1394 buses 15 and information of the connection at the ports 31a–31c.

The time counter 36 detects completion of data transfer when its node is not involved with the transfer of data. The time counter 36 is provided since the data transfer determination circuit 33 is not capable of detecting the completion of data transfer when its node is not involved with the data transfer. More specifically, when a node is involved with the transfer of data, it transmits or receives packets containing information related with the transferred data (the amount of the transferred data) or packets indicating the completion of the data transfer. However, when a node is not involved with the transfer of data (including cases when data is transferred via the node), it does not transmit or receive packets.

There are predetermined blank periods between packets during packet communication. If blank periods continue for a predetermined time or longer, this indicates that the transfer of data has been completed. The time counter 36 counts the number of the blank periods and resets its count value when the count value reaches a predetermined value. In this manner, the time counter 36 detects the completion of data transfer when its node is not involved with the data transfer.

More specifically, the time counter 36 clears the count value in response to the reset signal S3 from the data transfer determination circuit 33. When the count value reaches the predetermined value, the time counter 36 provides a time-up signal S4 to the reset control circuit 34.

The reset control circuit 34 detects completion of the data transfer using the time-up signal S4 and then performs bus reset. Even when the time counter 36 is performing a counting operation, the reset control circuit 34 performs bus reset in response to the bus reset signal S5 from the driver/receiver 32 and reconfigures the network to include the newly connected node in response to a bus reset signal from other nodes.

Figure 5:
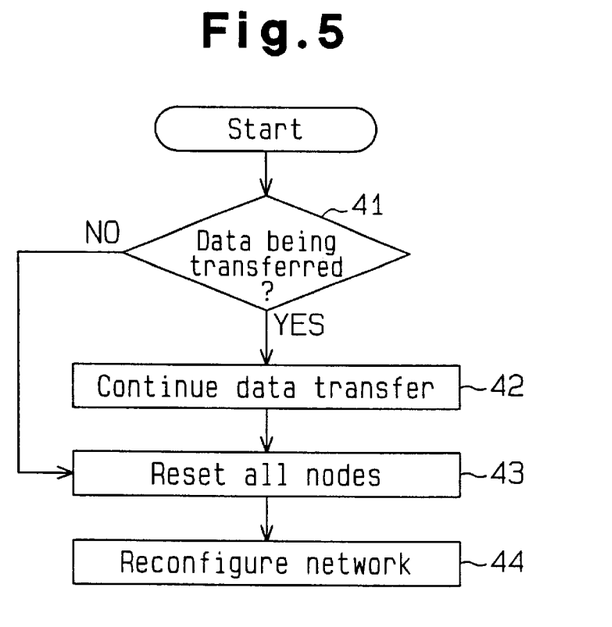
FIG. 5 is a flowchart illustrating the bus reset control performed by the protocol controller of FIG. 4.

FIG. 5 is a flowchart showing the operation of the IPC 21 when a new node is added to the network by connection to the IPC 21. The flowchart also illustrates the operation of the IPC 21 when an existing node is disconnected from it.

At step 41, the IPC 21 detects whether data is being transferred. If data is being transferred, the IPC 21 proceeds to step 42. If data is not being transferred, the IPC 21 proceeds to step 43. At step 42, the IPC 21 continues the transfer of data and waits until the data transfer is completed. When completion of the data transfer is detected, the IPC 21 proceeds to step 43.

At step 43, the IPC 21 performs bus reset, which resets all of the nodes. Then, at step 44, the IPC 21 performs various processes such as tree identification to reconfigure the network.

The operation of the IPC 21 when a new node is connected will now be described with reference to FIG. 6.

Figure 6:
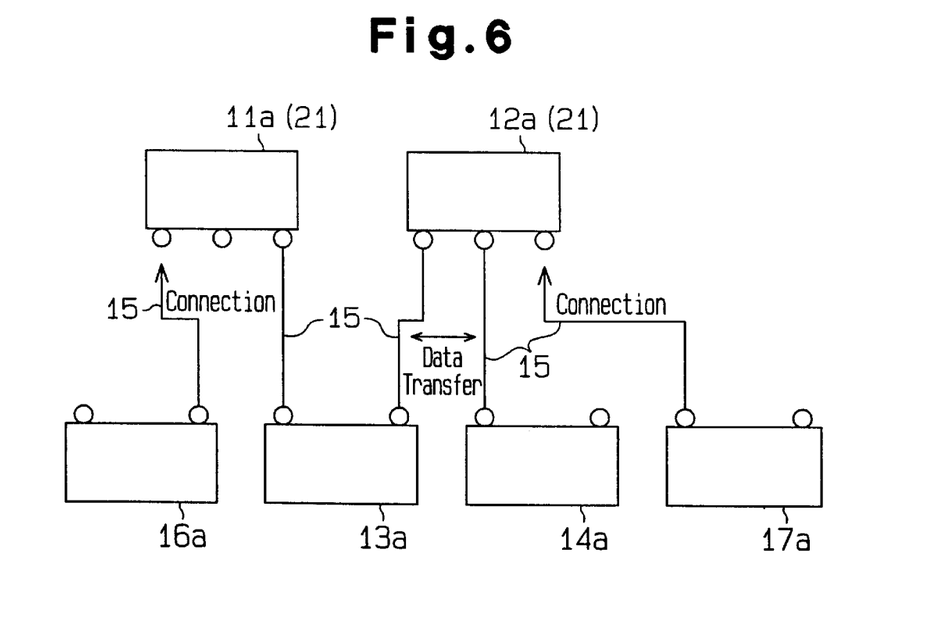
FIG. 6 is a schematic diagram showing a network to describe the bus reset control.

FIG. 6 illustrates a network including nodes 11a, 12a, 13a, 14a that are incorporated in the devices 11, 12, 13, 14, respectively, and connected to one another by the IEEE 1394 buses 15. Data is being transferred between the nodes 13a and 14a via the node 12a (node 12a acts as a repeater). The nodes 11a, 12a each have the IPC 21 which inhibit bus reset during the transfer of data when hot plugging is performed. In the present embodiment, for example, the nodes 13a, 14a each have a conventional IPC.

A new node 16a of the video camera 16 is connected to the node 11a and a new node 17a of the hard disk 17 is connected to the node 12a. In the present embodiment, for example, the nodes 16a, 17a each have a conventional IPC.

When connection of the two new nodes 16a, 17a is detected, the nodes 11a, 12a determine whether data is currently being transferred. In this case, data is being transferred between the nodes 13a, 14a, Thus, the IPCs 21 of the nodes 11a, 12a inhibit bus reset.

When the transfer of data between the nodes 13a, 14a is completed, the nodes 11a, 12a each start time count. For example, if the count value reaches the predetermined value in the node 11a, the node 11a outputs a bus reset signal to include the newly connected node 16a in the network. The node 12a, which is also performing the count operation, detects the bus reset signal generated by the node 11a, stops its count operation in response to the bus reset signal, and includes the newly connected node 17a in the network.

In the first embodiment, when the connection of a new node is detected, the IPC 21 determines whether data is being transferred in the network. If data is being transferred, the IPC 21 inhibits bus reset until the data transfer is completed and reconfigures the network after completion of the data transfer. Accordingly, the transfer of data is guaranteed. Further, retransmission of data due to bus reset or confirmation of data transfer are not needed. This facilitates the transfer of data.

It should be apparent to those skilled in the art that the present invention may be embodied in many other specific forms without departing from the spirit or scope of the invention. Particularly, it should be understood that the present invention may be embodied in the following forms.

Figure 7:
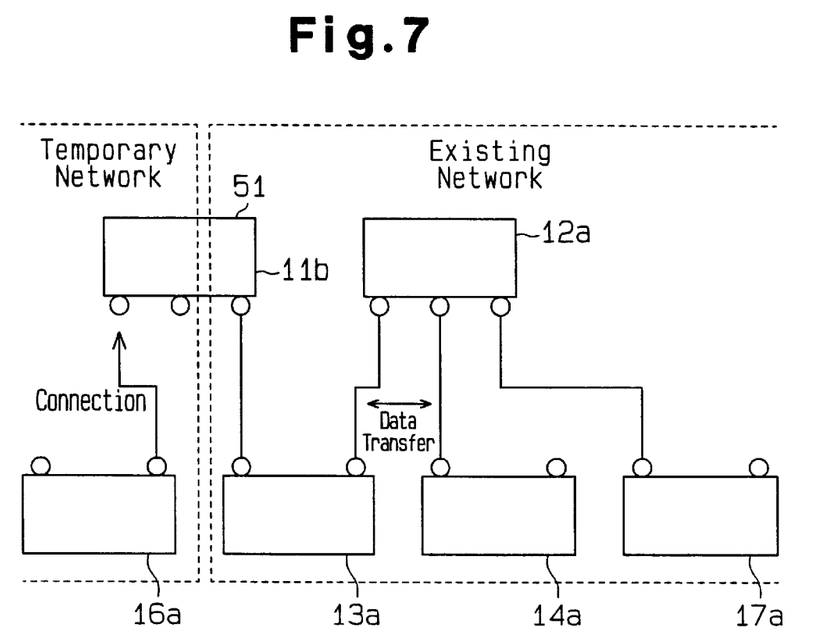
FIG. 7 is a schematic diagram showing a temporary network and an existing network.
Figure 8:
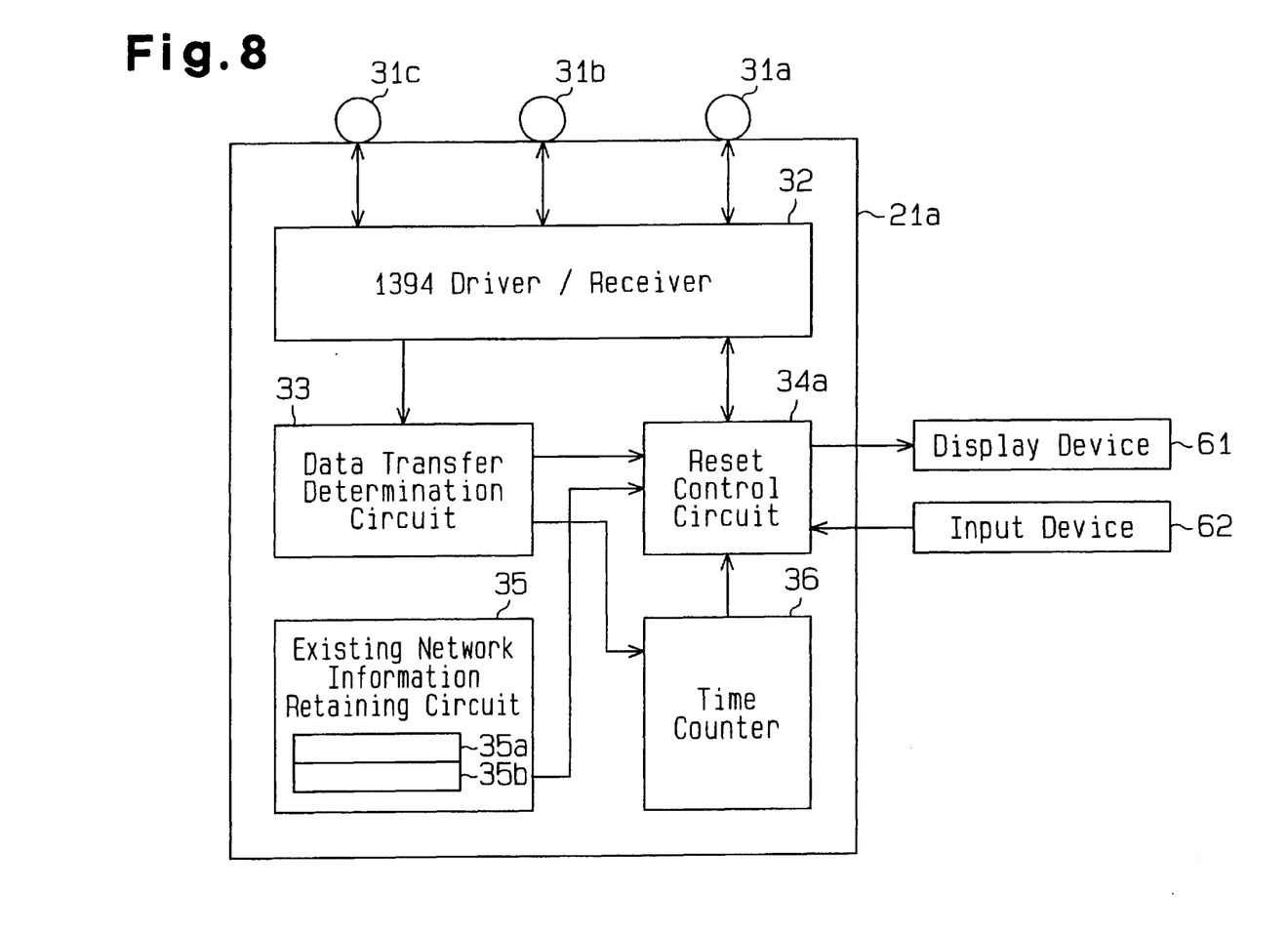
FIG. 8 is a schematic block diagram showing a protocol controller according to a second embodiment of the present invention.

(1) In the above embodiment, devices newly connected to the network are not included in the network until the bus reset is performed and the network is reconfigured. However, the new device may be allowed to communicate solely with the device to which it is connected. More specifically, an IPC 51 of a node 11b, which is shown in FIG. 7, has an existing network information retaining circuit 35 having a plurality (in this case, two) of sections 35a, 35b (FIG. 8). The first section 35a stores information of the devices forming the existing network. The existing network information retaining circuit 35 stores information of its own node and new nodes in the second section 35b. Based on the information, a temporary network, which is independent from the existing network, is formed by the node 11b and the new node 16a as shown in FIG. 7. This enables communication between the two nodes 11b, 16a.

However, data communication is not performed when the connected node (if the node is an IPC, the device incorporating the node) is transferring data (the node being the data transmitting node or the data receiving node). This is because the node cannot process two communications at the same time.

(2) When a new device is connected to the network, the IPC 21 inhibits bus reset and ensures completion of the transfer of data. However, when the transfer of data is interrupted manually by a user or automatically, the bus reset may be performed to reconfigure the network and restart the transfer of data afterward. In this case, the transfer of data is completed from the point at which it was stopped, without having to transfer the data again from the beginning.

In a first method, the bus reset is performed when the user permits the bus reset. In a second method, the node performing data transfer is instructed to temporarily step transferring data so that bus reset can be performed safely.

More specifically, with reference to FIG. 8, when the connection of a new node is detected during the transfer of data, a reset control circuit 34a of an IPC 21a provides a display device 61 with message data inquiring whether the network should be reconfigured to account for connection of the node. When the reset control circuit 34a receives permission for reconfiguring the network from an input device 62, the reset control circuit 34a performs bus reset.

Figure 9:
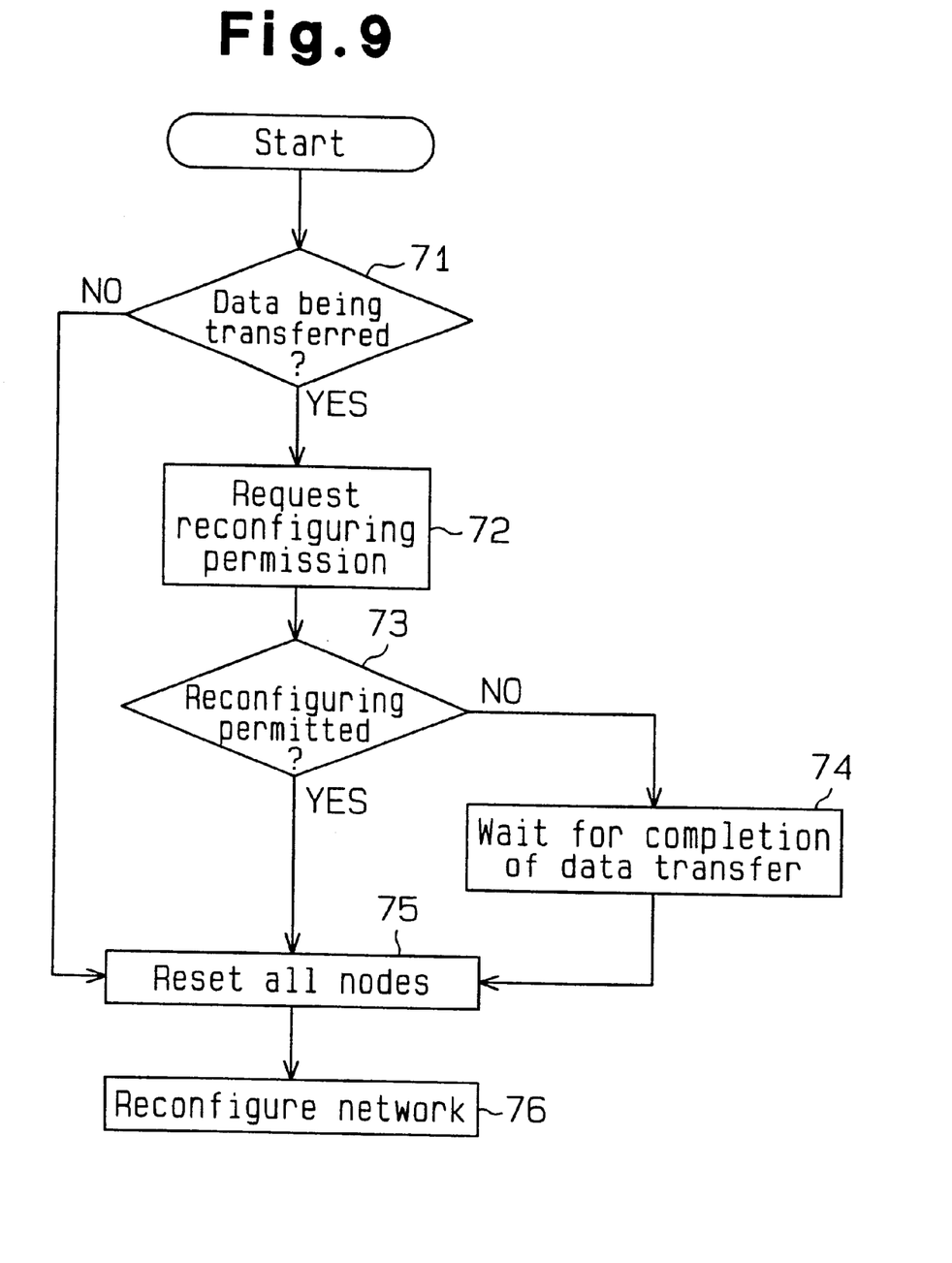
FIG. 9 is a flowchart illustrating the bus reset control performed by the protocol controller of FIG. 8.

With reference to FIG. 9, when the connection of a new node is detected, the IPC 21 determines whether data is being transferred (step 71) and, if data is being transferred, requests permission to reconfigure (step 72). Then, the IPC 21 determines whether reconfiguring permission has been given by the input device 62 (step 73) and, if the permission has not been given, waits for the completion of data transfer (step 74). If reconfiguration is permitted, the IPC 21a performs bus reset and resets all of the nodes (step 75), and the network is reconfigured (step 76). Afterward, when the user cancels the temporary data transfer interruption, the transfer of data is restarted. Accordingly, data is not required to be transferred again from the beginning.

Figure 10:
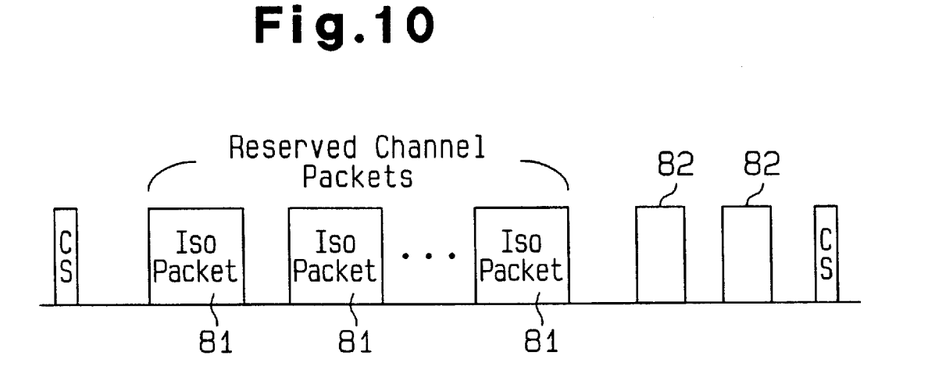
FIG. 10 is a diagram for describing packet communication.

The second method will now be described in detail. If the connection of a new node is detected when data is being transferred, the reset control circuit 34a provides the node that is transferring data with a packet instructing temporary interruption of the data transfer. With reference to FIG. 10, in the IEEE 1394 protocol, the packets transferred when data is being transferred include Iso (isochronous) packets 81 and Async (asynchronous) packets 82. The Iso packets 81 are reserved during data communication, and the Async packets 82 contain data. The Async packets 82 are used to provide temporary interruption instructions. The IPC 21a monitors the transfer of data and, when detecting an interruption in the data transfer, performs bus reset and resets all of the nodes. The IPC 21a then requests restart of the data transfer to the data transferring and data receiving nodes to restart the transfer of data. Accordingly, although the interruption of data transfer is required, the data does not have to be transferred from the beginning.

The generation of the message inquiring whether reconfiguring is necessary, the receipt of the reconfiguring permission, and the interruption and restarting of data transfer may be performed by nodes other than the node that detects connection of the new node. More specifically, the node detecting the newly connected node transmits an Async packet 82 with the detection information contained therein. A system including the display device 61 and the input device 62 (e.g., a personal computer) receives the packet 82, generates a message requesting reconfiguring permission, receives reconfiguring permission, and provides the results to the node that detected the new node. This ensures the transfer of data even when a new node is connected to an apparatus (e.g., hard disk 17) that is not provided with a display and an input device capable of generating the message and receiving the permission. Further, the data transferring node, the data receiving node, and the data transfer controlling node control the interruption and restart of the data transfer in response to the new node connection information contained in the packet 82. In this manner, error-free interruption and restart of the data transfer is ensured.

Furthermore, when performing bus reset after interrupting data transfer, each of the nodes may retain a physical node number that was allocated prior to the reset. By reconfiguring the network using the physical node number allocated prior to the reset, data transfer is easily restarted. More specifically, the data transfer is designated by the physical node numbers of the data transferring and receiving nodes. During normal bus reset, a physical node number differing from that prior to reset may be allocated to a node. Thus, it is difficult to restart data transfer using the physical node number. Accordingly, the restart of data transfer is facilitated by allocating the same physical node number used prior to the reset to each node after the reset. As another option, the node that performs bus reset may holds a first physical node number allocated prior to the reset and a second physical allocated after the reset. In this case, the node that performs bus reset associates the first physical node number with the second physical node number and the other nodes perform normal reset.

(3) The present invention may be applied to an interface controller other than the IEEE 1394 protocol controller 21 having a hot plugging function.

The present examples and embodiments are to be considered as illustrative and not restrictive, and the invention is not to be limited to the details given herein, but may be modified within the scope and equivalence of the appended claims.

What is claimed is:

1. A method for controlling a network having a configuration including a plurality of nodes, comprising the steps of:
   recognizing the connection of a new node to the network;
   determining whether a communication is being performed in the network;
   configuring a temporary network based on the determination result;
   completing the communication after the configuring step; and
   reconfiguring the network, which includes the new node, subsequent to completion of the communication based on the determination result.

2. The method according to claim 1, wherein the recognizing step includes recognizing the connection of the new node by one of detecting the connection of the new node and receiving information indicating the connection of the new node.

3. The method according to claim 1, further comprising the steps of:
   inquiring for permission to reconfigure the new network before completion of the communication; and
   reconfiguring the network without waiting for completion of the communication when reconfiguration permission is received.

4. The method according to claim 1, wherein the determining step includes determining completion of the communication when a period during which data is not transferred in the network continues for at least a predetermined length of time.

5. The method according to claim 1, wherein the determining step includes determining completion of the communication by receiving a command indicating completion of the communication.

6. The method according to claim 1, further comprising the steps of:
   receiving a command signal instructing that the network be reconfigured; and
   reconfiguring the network without waiting for completion of the communication in response to the command signal.

7. The method according to claim 1, further comprising the steps of:
   detecting one of completion of the communication and receipt of a command for reconfiguring the network; and
   dissolving the temporary network in response to the detecting step.

8. The method according to claim 1, wherein at least one of the nodes includes a display device and an input device, the method further comprising the steps of:
   displaying on the display device an inquiry for permission to reconfigure the network before completion of the communication; and
   reconfiguring the network without waiting for completion of the communication when reconfiguring permission is provided from the input device.

9. The method according to claim 1, wherein communication in the network is performed by a first packet transferred during a predetermined period and a second packet transferred during the predetermined period at a time not occupied by the first packet, the method further comprising the step of:
   notifying a network controller of the connection of the new node using the second packet.

10. The method according to claim 1, further comprising the steps of:
    transferring a packet including a temporary interruption instruction that requires interruption of the communication to a communicating node based on the determination result;
    reconfiguring the network including the new node, subsequent to the interruption of the data communication; and
    restarting the data communication subsequent to the reconfiguration of the network.

11. The method according to claim 10, the method further comprising the step of:
    instructing restart of the communication using the second packet.

12. The method according to claim 10, wherein each of the nodes has a physical node number, and wherein the network reconfiguring step includes reconfiguring the network using the physical node numbers.

13. The method according to claim 1, wherein the temporary network includes at least one node which is not communicating.

14. The method according to claim 1, wherein the temporary network is independent from the network.

15. The method according to claim 1, further comprising the steps of:
    interrupting the communication; and
    reconfiguring the network including the new node.

16. An apparatus for controlling a network having a configuration including a plurality of nodes that transfers a first packet and a second packet, comprising:
    a data transfer determination circuit for determining whether communication is being performed in the network; and
    a reset control circuit, connected to the determination circuit, for recognizing the connection of a new node to the network and configuring a temporary network, based on the determination result of the data transfer determination circuit, and reconfiguring the network to include the new node, subsequent to completion of the communication after configuring the temporary network.

17. The apparatus according to claim 16, further comprising a receiver circuit connected to the reset control circuit, wherein the receiver circuit detects the connection of a new node and provides a detection signal to the reset control circuit.

18. The apparatus according to claim 17, wherein the receiver circuit transmits to or receives from the network a notification signal indicating completion of the communication, wherein the reset control circuit receives the notification signal from the receiver circuit and determines completion of the communication based on the notification signal.

19. The apparatus according to claim 17, further comprising a time counter connected to the data transfer determination circuit for counting the periods during which data communication is not being performed in the network based on tie determination result of the data transfer determination circuit and generating a time-up signal when the periods continue consecutively for a predetermined number of times, and wherein the reset control circuit determines the completion of the communication in accordance with the time-up signal from the time counter.

20. The apparatus according to claim 16, wherein the reset control circuit inquires of at least one of the nodes for permission to reconfigure the network before the completion of the communication and reconfigures the network without waiting for the completion of the communication upon receipt of reconfiguring permission from the at least one of the nodes.

21. The apparatus according to claim 16, wherein the reset control circuit reconfigures the network without waiting for the completion of the communication in response to a command signal to reconfigure the network from at least one of the nodes in the existing network before the completion of the communication.

22. The apparatus according to claim 16, wherein at least one of the nodes includes a display device and an input device, wherein the reset control circuit displays on the display device an inquiry for permission to reconfigure the network before the completion of the communication, and reconfigures the network without waiting for completion of the communication when reconfiguring permission is provided via the input device.

23. The apparatus according to claim 16, wherein communication in the network is performed by a first packet transferred during a predetermined period and a second packet transferred during the predetermined period at a time not occupied by the first packet, and wherein the reset control circuit notifies the network of information indicating the connection of the new node using the second packet.

24. The apparatus according to claim 16, wherein the reset control circuit dissolves the temporary network when the communication is completed.

25. The apparatus according to claim 16, wherein the reset control circuit dissolves the temporary network without waiting for the completion of the communication and reconfigures the network when receiving a command signal for reconfiguring the network.

26. The apparatus according to claim 14, wherein the reset control circuit transfers a second packet including a temporary interruption instruction that requires interruption of the communication to a communicating node based on the determination result of the data transfer determination circuit, wherein the reset control circuit reconfigures the network, which includes the new node, subsequent to the interruption of the communication, and restarting the data communication.

27. The apparatus according to claim 26, wherein the reset control circuit instructs restart of the communication using the second packet.

28. The apparatus according to claim 26, further comprising a network information retaining circuit, in communication with the reset control circuit, for retaining physical node numbers, each node being allocated one of the physical node numbers, wherein the reset control circuit reconfigures the network using the physical node numbers.

29. The apparatus according to claim 16, wherein the temporary network is independent from the network.

30. The apparatus according to claim 16, wherein the communication is interrupted and the network is reconfigured after the interruption of the communication.

31. A method for controlling a network having a configuration including a plurality of nodes, comprising the steps of:

recognizing the connection of a new node to the network;

determining whether a communication is being performed in the network;

configuring a temporary network which is independent from the network;

completing the communication after the configuring step; and reconfiguring the network, which includes the new node, subsequent to completion of the communication based on the determination result.

32. An apparatus for controlling a network having a configuration including a plurality of nodes that transfers a first packet and a second packet, comprising:

a data transfer determination circuit for determining whether communication is being performed in the network; and a reset control circuit, connected to the determination circuit, for recognizing the connection of a new node to the network, configuring a temporary network which is independent from the network, and reconfiguring the network to include the new node, subsequent to completion of the communication after configuring the temporary network.

* * * * *